(12) United States Patent
Arakawa et al.

(10) Patent No.: US 12,582,032 B2
(45) Date of Patent: Mar. 24, 2026

(54) WORK MACHINE

(71) Applicant: HONDA MOTOR CO., LTD., Tokyo (JP)

(72) Inventors: Takayuki Arakawa, Wako (JP); Hiroshi Hojo, Wako (JP); Norikazu Shimizu, Wako (JP); Sotaro Furuta, Wako (JP); Susumu Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 697 days.

(21) Appl. No.: 17/975,682

(22) Filed: Oct. 28, 2022

(65) Prior Publication Data

US 2023/0144059 A1 May 11, 2023

(30) Foreign Application Priority Data

Nov. 5, 2021 (JP) ................................. 2021-181407

(51) Int. Cl.
| | |
|---|---|
| *A01D 34/82* | (2006.01) |
| *A01D 34/73* | (2006.01) |
| *A01D 101/00* | (2006.01) |

(52) U.S. Cl.
CPC ........... *A01D 34/828* (2013.01); *A01D 34/73* (2013.01); *A01D 2101/00* (2013.01)

(58) Field of Classification Search
CPC ... A01D 34/828; A01D 34/73; A01D 2101/00
See application file for complete search history.

(56) References Cited

U.S. PATENT DOCUMENTS

| | | | | | |
|---|---|---|---|---|---|
| 2,906,082 | A | * | 9/1959 | Mathis | ................. A01D 34/828 56/320.1 |
| 2,934,882 | A | * | 5/1960 | Kaut, Jr. | .............. A01D 34/828 56/320.1 |
| 2,972,849 | A | * | 2/1961 | Ridenour | ............... A01D 75/20 D15/17 |
| 3,038,289 | A | * | 6/1962 | Cross | ..................... A01D 75/20 56/255 |
| 3,057,140 | A | * | 10/1962 | Ridenour | ............... A01D 34/63 56/DIG. 15 |
| 3,098,337 | A | | 7/1963 | Teachworth | |
| 3,148,490 | A | * | 9/1964 | Chadwick | ............ A01D 34/828 56/320.2 |
| 3,312,049 | A | * | 4/1967 | Walker | ................. A01D 34/828 56/255 |

(Continued)

FOREIGN PATENT DOCUMENTS

| | | | | |
|---|---|---|---|---|
| DE | 102006038553 A1 | * | 2/2008 | ............. A01D 34/82 |
| GB | 2283651 A | | 5/1995 | |
| JP | 2016-208950 A | | 12/2016 | |

OTHER PUBLICATIONS

German Office Action for German Patent Application No. 102022128902.8 mailed Dec. 4, 2024 (partially translated).

*Primary Examiner* — Claude J Brown
(74) *Attorney, Agent, or Firm* — THOMAS | HORSTEMEYER, LLP

(57) ABSTRACT

A work machine comprising: a blade; a blade housing; and a guard pole portion provided below the blade, wherein the guard pole portion is supported by the blade housing, and the guard pole portion includes an inclined portion extending in an oblique direction with respect to a machine body longitudinal direction of the work machine.

12 Claims, 4 Drawing Sheets

(56)             References Cited

U.S. PATENT DOCUMENTS

| | | | | |
|---|---|---|---|---|
| 3,481,124 A | * | 12/1969 | Machovina | A01D 34/828 |
| | | | | 56/255 |
| 3,665,693 A | * | 5/1972 | Dacus | A01D 75/20 |
| | | | | 56/320.1 |
| 3,680,294 A | * | 8/1972 | Dacus | A01D 34/828 |
| | | | | 56/320.1 |
| 3,971,199 A | * | 7/1976 | Buchele | A01D 34/828 |
| | | | | 56/320.2 |
| 4,015,408 A | * | 4/1977 | Cornellier | A01D 34/828 |
| | | | | 56/17.4 |
| 4,037,396 A | * | 7/1977 | Buchele | A01D 34/828 |
| | | | | 56/320.1 |
| 6,269,621 B1 | * | 8/2001 | Fischier | A01D 34/74 |
| | | | | 56/320.2 |
| 10,542,670 B2 | * | 1/2020 | Cmich | A01D 34/733 |
| 2019/0297777 A1 | * | 10/2019 | Patel | A01D 34/828 |

* cited by examiner

F I G. 4
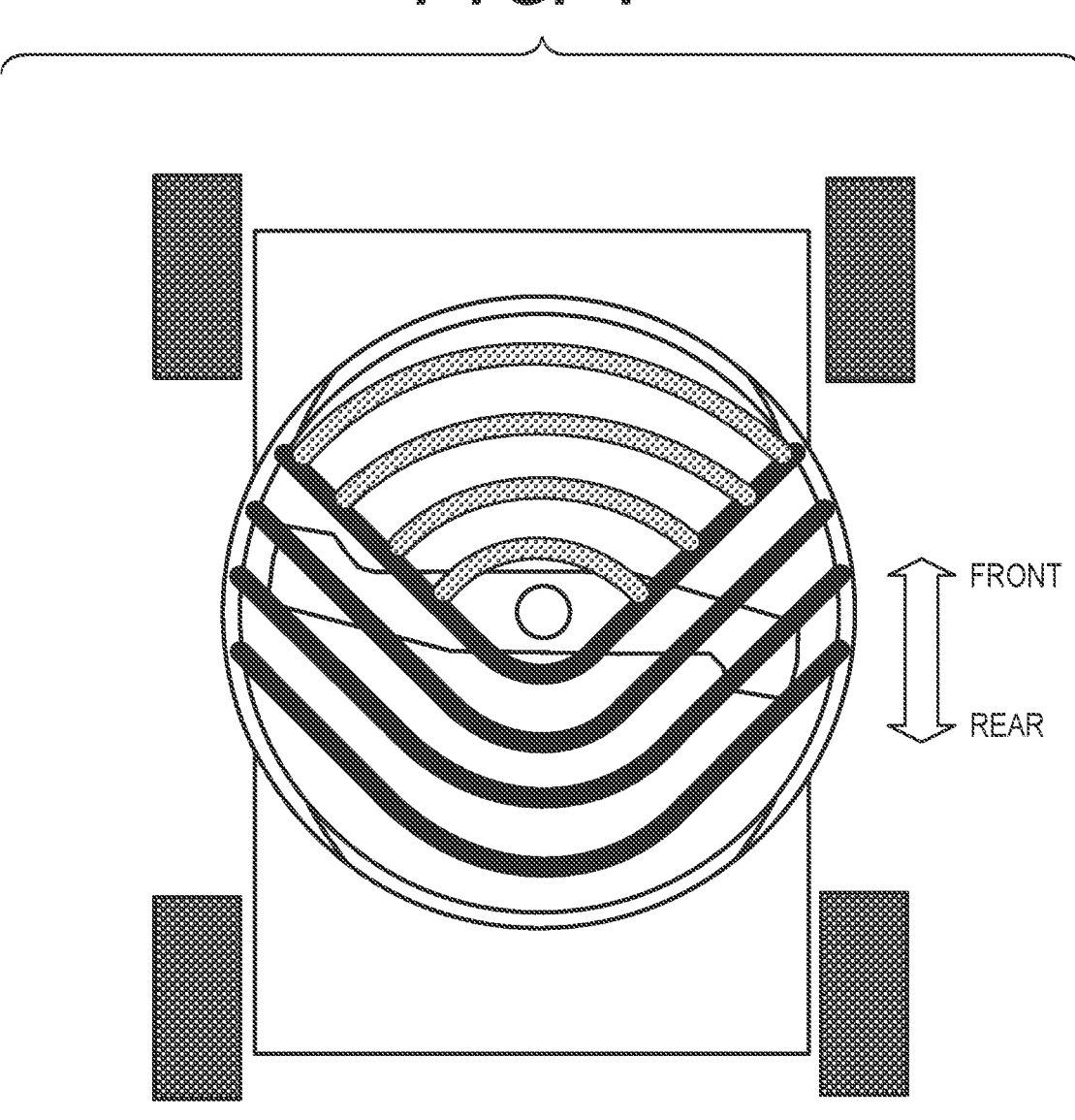

F I G. 5
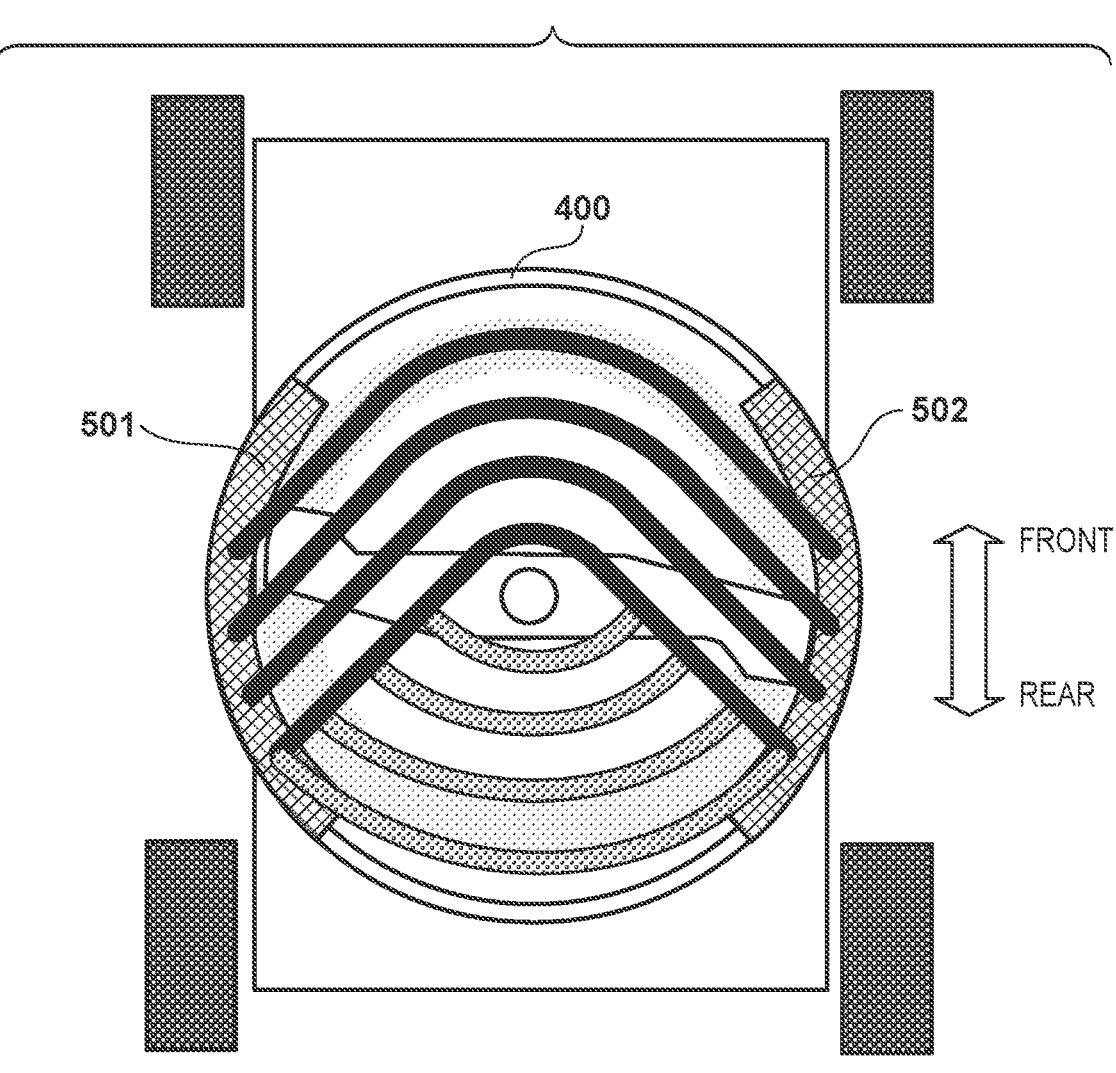
F I G. 6
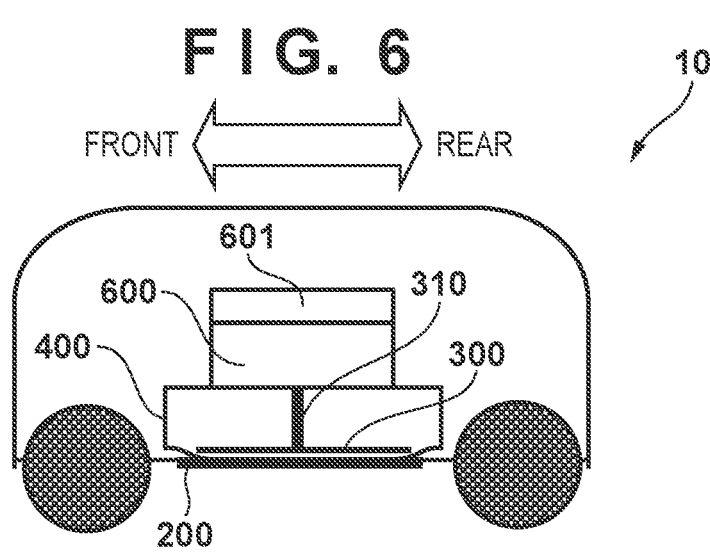

WORK MACHINE

CROSS-REFERENCE TO RELATED APPLICATION(S)

This application claims priority to and the benefit of Japanese Patent Application No. 2021-181407 filed on Nov. 5, 2021, the entire disclosure of which is incorporated herein by reference.

BACKGROUND OF THE INVENTION

Field of the Invention

The present invention relates to a work machine.

Description of the Related Art

Japanese Patent Laid-Open No. 2016-208950 discloses a guard mechanism 20 that protects a rotary blade 30 from foreign matter such as pebbles and protects an operator and nearby people from the rotating rotary blade 30. The guard mechanism 20 includes one or a plurality of guard portions 21 that cover the rotary blades 30, and the guard portions 21 are arranged in a direction parallel to the machine body longitudinal direction.

However, in the technology described in Japanese Patent Laid-Open No. 2016-208950, since the guard portion is the same in the machine body longitudinal direction, plants on the extension line of the guard portion are stepped on by the guard portion, and there is a problem that uncut parts are likely to occur.

The present invention has been made in response to the recognition of the above problems, and provides a technology for efficiently cutting plants while maintaining work safety.

SUMMARY OF THE INVENTION

According to one aspect of the invention, there is provided a work machine comprising: a blade; a blade housing; and a guard pole portion provided below the blade, wherein the guard pole portion is supported by the blade housing, and the guard pole portion includes an inclined portion extending in an oblique direction with respect to a machine body longitudinal direction of the work machine.

BRIEF DESCRIPTION OF THE DRAWINGS

The accompanying drawings illustrating embodiments in the present invention constitute a part of the specification, and are used together with the description to describe the present invention.

FIG. 4 is a diagram illustrating a structure of a lawn mower according to a modification example;

FIG. 5 is a diagram illustrating a structure of a lawn mower according to the modification example; and FIG. 6 is a diagram illustrating an example of the structure of the lawn mower according to the embodiment.

DESCRIPTION OF THE EMBODIMENTS

Figure 1:
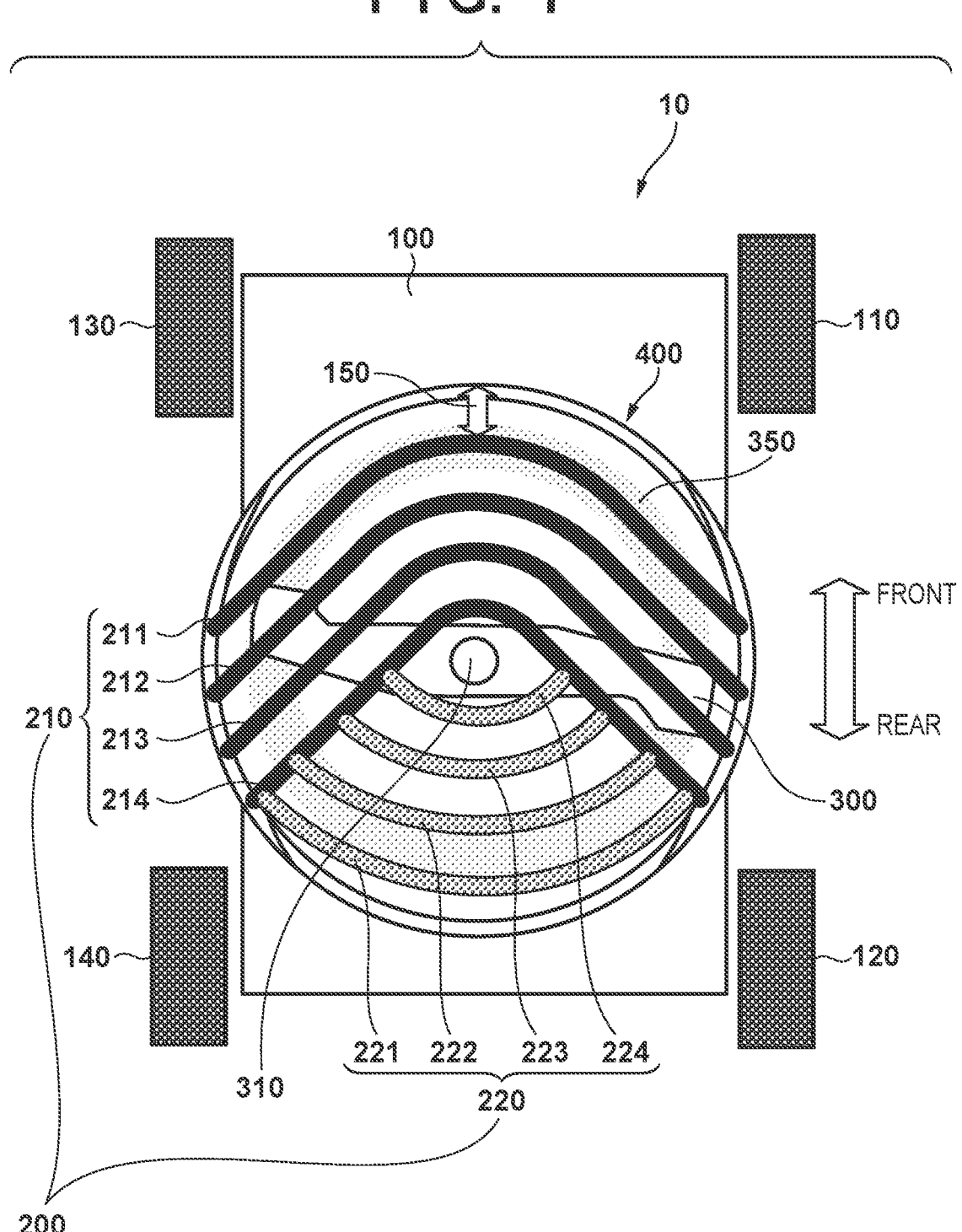
FIG. 1 is a diagram illustrating an example of a structure of a lawn mower according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

In the following description, expressions such as front/rear, up/down, and lateral sides (left/right) will be used, in some cases, as expressions indicating relative directions indicated with respect to a vehicle body of a lawn mower as a reference. For example, the term "front" indicates the front side of the vehicle body in the front-and-rear direction, and the term "upper" indicates a height direction of the vehicle body.

FIG. 1 is a diagram illustrating an example of a structure of a lawn mower according to the present embodiment. The lawn mower according to the present embodiment is, for example, a self-propelled lawn mower that performs lawn mowing work while traveling independently. FIG. 1 is a view of a lawn mower 10 observed from below. An upper side of the drawing is an advancing direction of the lawn mower 10, that is, a front side of the lawn mower 10, and a lower side of the drawing is a rear side of the lawn mower 10. In addition, the right side of the drawing is the left side of the lawn mower 10, and the left side of the drawing is the right side of the lawn mower 10. The lawn mower 10 illustrated in FIG. 1 includes a base portion 100, wheels 110 to 140, a guard pole portion 200, a blade 300, and a blade housing 400. FIG. 6 is a schematic diagram of an internal configuration of the lawn mower according to the present embodiment, which is observed from a horizontal direction. A driving source 600 including a battery and a motor, and an electronic control unit (ECU) 601 that controls the driving source 600 are arranged inside the lawn mower 10. Under the control of the ECU 601, the blade 300 rotates about a rotary shaft 310 by the drive of the driving source 600, whereby plants can be cut. The lawn mower 10 also includes a driving source for traveling for driving wheels (for example, rear wheels), a camera for capturing images of an external environment, and the like, but these are not illustrated. The lawn mower 10 can cut plants while autonomously traveling by the ECU 601 analyzing a video of a camera (not illustrated) and controlling the driving source 600 and the driving source for traveling based on the analysis result.

The wheel 110 is a left front wheel, the wheel 120 is a left rear wheel, the wheel 130 is a right front wheel, and the wheel 140 is a right rear wheel. In the illustrated example, the vehicle travels on wheels, but other configurations such as a caterpillar may be used.

The guard pole portion 200 is a structure for protecting the blade 300 from foreign matters such as stones and protecting an operator and nearby people from the rotating blade. The guard pole portion 200 may be arranged on a plane parallel to the ground. The guard pole portion 200 includes a plurality of guard poles 210 and a support pole portion 220. The plurality of guard poles 210 include guard poles 211 to 214. The support pole portion 220 includes support poles 221 to 224. In the illustrated example, four guard poles and four support poles are included, but the numbers are not limited. Each of the guard poles and support poles is, for example, a columnar pole made of a metal. Each of the guard poles and support poles can be, for example, a columnar pole having a diameter of approximately 8 mm, but the diameter can be any value depending on the size of the lawn mower 10. The interval between the guard poles may be approximately 5 cm. An interval (for example, the interval is approximately the same as the interval between the guard poles, which is, for example, 5 cm) indicated by an arrow 150 is secured between the foremost guard pole 211 and the blade housing 400. As a result, sufficient space is secured for plants that fall from the blade housing 400 to rise, and the cutting efficiency can be improved.

Figure 2:
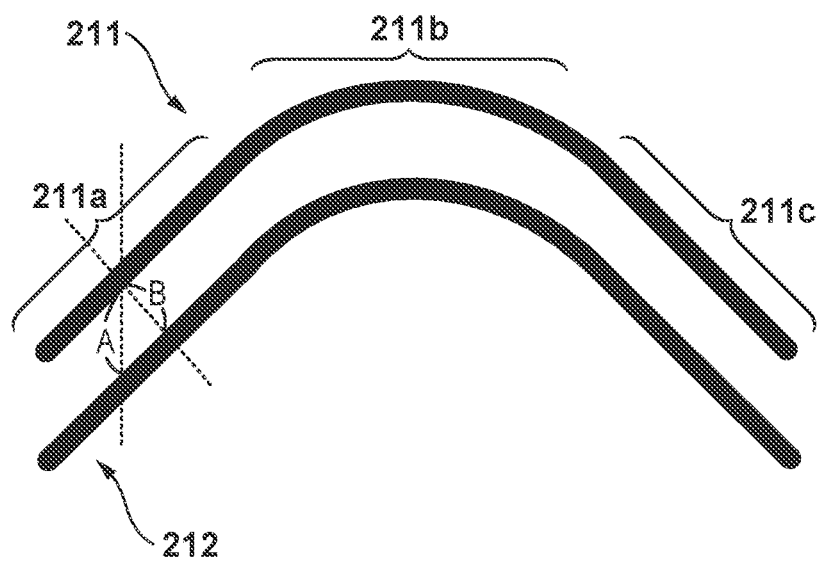
FIG. 2 is a diagram illustrating an example of a guard pole according to the embodiment.

Both end portions of each of the plurality of guard poles 210 are connected to the blade housing 400. The shape of a guard pole 211 included in the plurality of guard poles 210 will be described with reference to FIG. 2. The other guard poles have the same shape. The guard pole 211 includes an inclined portion extending in an oblique direction with respect to the machine body longitudinal direction of the lawn mower 10. The oblique direction is a direction of approximately 45 degrees in the illustrated example, but may be, for example, any direction in a range of 15 degrees to 75 degrees with respect to the machine body longitudinal direction. The inclined portions of each guard pole may be parallel to each other. The inclined portions include a left inclined portion 211c and a right inclined portion 211a extending in the oblique direction respectively to the left and right with respect to the machine body longitudinal direction of the lawn mower 10. The left inclined portion 211c and the right inclined portion 211a are continuous in an arc shape at the center of the lawn mower 10. That is, the guard pole 211 includes the right inclined portion 211a, an arc portion 211b, and the left inclined portion 211c. The arc-shaped parts of each of the guard poles 211 to 214 are concentrically arranged.

In a case where a plurality of guard poles are arranged in parallel in the advancing direction, the plants are always pushed down by the guard poles, and thus it is difficult to cut the plants with the blade 300 on the extension line of the guard poles, and uncut parts are likely to occur. On the other hand, in a case where a plurality of guard poles are arranged perpendicular to the advancing direction, after the plants are pushed down by the guard poles, the plants rise when the guard poles pass. However, the plants are pushed down again by the next guard pole before rising, and thus uncut parts are likely to occur similarly.

Here, since the guard pole 211 includes the inclined portion, it is possible to avoid a state where the plants are always pushed down as in a case where a plurality of guard poles are arranged in parallel with the advancing direction. In addition, since an interval A wider than an interval B between the guard poles in FIG. 2 can be secured, it is easy to secure a distance for the plants to rise after the guard pole 211 passes, and it is possible to reduce uncut parts. In this manner, by providing the inclined portion on the guard pole, it is possible to improve the cutting efficiency while maintaining the safety of the operator and nearby people.

Both end portions of each of the support poles 221 to 224 of the support pole portion 220 are connected to the guard pole 214 in the example of FIG. 1. Each of the support poles 221 to 224 of the support pole portion 220 has an arc shape. The support poles 221 to 224 are arranged at equal intervals.

The blade 300 is an edge for cutting plants (for example, weeds, grass, and the like), and can cut the plants by rotating about the rotary shaft 310. The blade and the shearable region will now be described with reference to FIG. 3. The blade 300 has shearing portions near both end portions, and rotation of the shearing portions enables cutting of plants at the position of the shearable region 350. In other words, the shearable region 350 is an annular region having a predetermined width and formed by rotation of the shearing

Figure 3:
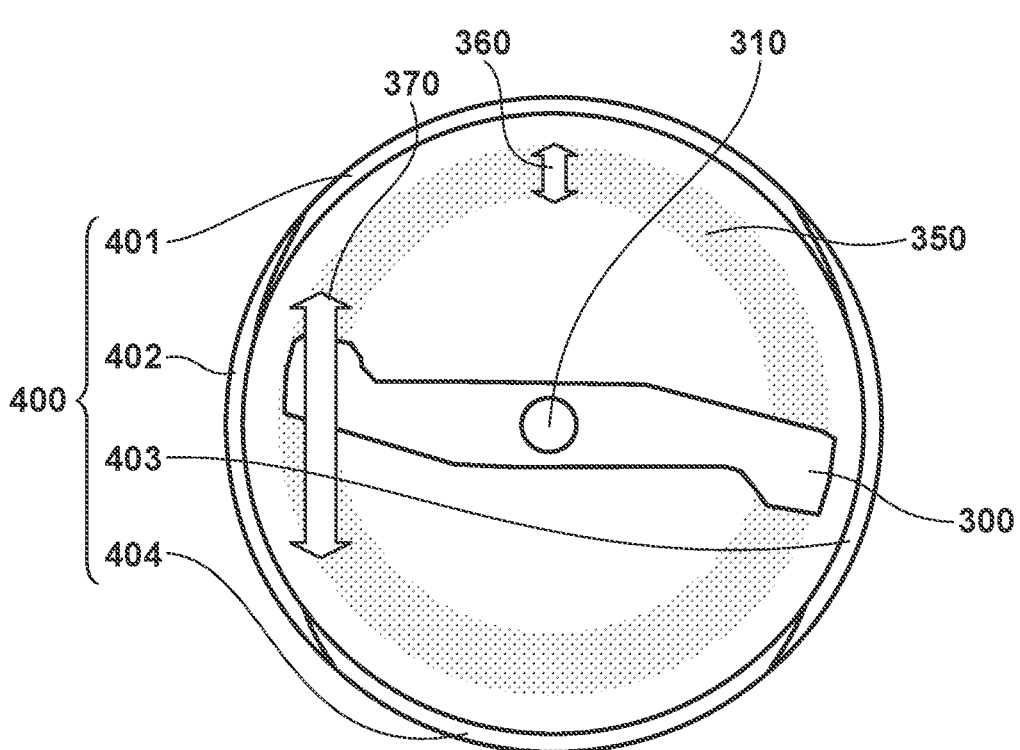
FIG. 3 is an explanatory view of a blade, a shearable region, and a blade housing according to the embodiment.

4 portion of the blade 300 about the rotary shaft 310 of the blade 300. The inclined portions of each guard pole are provided below at least a part of the shearable region 350 of the blade 300. In particular, the guard pole is arranged such that the shearable region 350 (in particular, the position of the left and right parts in the annular region) is positioned above the left inclined portion and the right inclined portion of the guard pole. The right and left parts in the annular region have more chances to cut plants than the front and rear parts. For example, as illustrated in FIG. 3, the front part in the annular region is cut by a width indicated by the arrow 360 is cut, but the right part in the annular region (a part on the right side as viewed from the lawn mower 10) is cut by a width indicated by the arrow 370 is cut, and the plants can be cut particularly efficiently at the right and left parts. Therefore, by arranging the inclined portion of the guard pole at a position corresponding to the left and right parts, it is possible to improve cutting efficiency while securing work safety.

The blade housing 400 is a housing provided to cover at least a part of the blade 300 from above. The blade housing 400 includes a front part 401, a right side part 402, a left side part 403, and a rear part 404. The right side part 402 and the left side part 403 extend below the front part 401 and the rear part 404. The front part 401 and the rear part 404 are positioned slightly above the right side part 402 and the left side part 403 such that the plants in the advancing direction can be guided below the lawn mower 10. The plurality of guard poles 211 to 214 of the guard pole portion 200 are connected to the right side part 402 and the left side part 403 of the blade housing 400.

As described above, the lawn mower 10 according to the present embodiment includes the guard pole portion having the inclined portion extending in the oblique direction with respect to the machine body longitudinal direction of the lawn mower 10. As a result, since the interval between the guard poles in the machine body longitudinal direction of the lawn mower can be widened, the plants can easily rise, and the plants can be efficiently cut. Furthermore, in a case where the guard poles are arranged in a direction parallel to the machine body longitudinal direction of the lawn mower 10, the plants are always pushed down, and uncut parts are likely to occur. However, by providing the inclined portion, the occurrence of such uncut parts can be reduced. Therefore, it is possible to efficiently cut plants while maintaining work safety.

Modification Example

The structure of the guard pole portion 200 is not limited to the above embodiment. Any structure may be employed as long as the structure includes the inclined portion extending in the oblique direction with respect to the machine body longitudinal direction of the lawn mower 10. For example, as illustrated in FIG. 4, the guard pole portion 200 in FIG. 1 may be rotated by 180 degrees.

Alternatively, as in the guard pole portion 200 in FIGS. 1 and 4, the left inclined portion and the right inclined portion of the guard pole may be configured to be continuous in a straight line instead of an arc shape at the center part of the lawn mower 10. That is, the left inclined portion 211c and the right inclined portion 211a of the guard pole 211 may be configured to be continuous in a state of being bent at a substantially right angle at the center part of the lawn mower 10.

In the above embodiment, the example in which each of the guard poles is connected to the right side part 402 and the left side part 403 of the blade housing 400 has been described, but the present invention is not limited to this example. For example, as illustrated in FIG. 5, a right support portion 501 and a left support portion 502 may be attached respectively to the right side and the left side of the blade housing 400, and each of the guard poles may be connected to the right support portion 501 and the left support portion 502. The right support portion 501 and the left support portion 502 can be members having a thickness of, for example, approximately several cm. In this case, the height of the blade housing 400 may be the same over the entire arc.

As a result, a stronger connection can be made at the connection part to which the guard pole portion is connected. In particular, by providing the support portion having a larger area in the horizontal direction than the blade housing 400, the connection area in the direction parallel to the ground can be increased, and thus a stronger connection can be realized. In addition, since the support portion may be attached to the blade housing, it is not necessary to change the shape of the blade housing at the front, rear, left, and right sides, and thus the manufacturing cost of the blade housing can be reduced.

In addition, although the lawn mower has been described as an example in the above-described embodiment, the structure of the above-described embodiment can be widely applied regardless of whether the lawn mower is a riding type lawn mower or a self-propelled lawn mower. The structure of the above embodiment can also be applied to other work machines (such as grass mowers) other than the lawn mowers.

The invention is not limited to the foregoing embodiments, and various variations/changes are possible within the spirit of the invention.

SUMMARY OF EMBODIMENTS

1. A work machine (for example, 10) according to the above embodiment includes:
   a blade (for example, 300);
   a blade housing (for example, 400); and
   a guard pole portion (for example, 200) provided below the blade, in which
   the guard pole portion is supported by the blade housing, and
   the guard pole portion includes an inclined portion (for example, 211*a*, 211*c*) extending in an oblique direction with respect to a machine body longitudinal direction of the work machine.
   Accordingly, it is possible to efficiently cut plants while maintaining work safety.

2. In the work machine (for example, 10) according to the above embodiment,
   the inclined portion is provided below at least a part of the shearable region (for example, 350) of the blade.
   In this manner, by arranging the guard pole below the shearable region of the blade, it is possible to prevent an operator and nearby people from coming into contact with the blade, and thus, it is possible to secure the work safety.

3. In the work machine (for example, 10) according to the above embodiment,
   the guard pole portion includes a plurality of guard poles (for example, 211 to 214), and
   the inclined portions of each of the guard poles are parallel to each other.

As a result, the interval between the guard poles becomes uniform, and thus it is possible to reduce uneven cutting of plants.

4. In the work machine (for example, 10) according to the above embodiment,
   the inclined portion includes a left inclined portion (for example, 211*c*) and a right inclined portion (for example, 211*a*) extending in the oblique direction respectively to the left and right with respect to the machine body longitudinal direction of the work machine, and
   the left inclined portion and the right inclined portion are continuous in an arc shape at a center of the work machine (for example, 211*b*).

As a result, it is possible to efficiently cut plants while improving the strength of the guard pole.

5. In the work machine (for example, 10) according to the above embodiment,
   the left inclined portion and the right inclined portion extend obliquely backward respectively to the left and right, from a position on a center line passing through the center of the work machine and extending in the machine body longitudinal direction.

As a result, in a case where an obstacle such as a plant, a pebble, or a tree branch present in the advancing direction of the work machine collides with the guard pole, a force that deforms the guard pole acts. However, it is possible to improve the durability of the guard pole against the force applied in such a case. For example, even in a case where an obstacle collides with the arc portion 211*b*, deformation of the guard pole 211 can be suppressed.

6. In the work machine (for example, 10) according to the above embodiment,
   the guard pole portion includes a plurality of guard poles (for example, 211 to 214), and
   the arc-shaped parts (for example, 211*b*) of each of the guard poles are concentrically arranged.

As a result, the interval between the guard poles becomes uniform, and thus it is possible to reduce uneven cutting of plants.

7. In the work machine (for example, 10) according to the above embodiment,
   the guard pole portion includes a support pole portion (for example, 220) that supports the inclined portion.

As a result, rigidity of the guard pole portion can be improved, and thus deformation of the guard pole portion can be suppressed even in a case where a force is applied from the outside.

8. In the work machine (for example, 10) according to the above embodiment,
   the support pole portion has an arc shape.

As a result, it is possible to efficiently cut plants left uncut on the front side of the work machine in the machine body longitudinal direction, on the rear side.

9. In the work machine (for example, 10) according to the above embodiment,
   the support pole portion includes a plurality of support poles (for example, 221 to 224), and the plurality of support poles are arranged at equal intervals.

As a result, the interval between the support poles becomes uniform, and thus it is possible to reduce uneven cutting of plants.

10. In the work machine (for example, 10) according to the above embodiment,
    the guard pole portion is arranged parallel to the ground.
    Accordingly, unevenness in height of plants after cutting is reduced.

11. In the work machine (for example, 10) according to the above embodiment, the oblique direction is any direction in a range of 15 degrees to 75 degrees with respect to the machine body longitudinal direction.

Accordingly, it is possible to more efficiently cut plants.

12. In the work machine (for example, 10) according to the above embodiment, the shearable region is an annular region having a predetermined width and formed by rotation of a shearing portion of the blade about a rotary shaft (for example, 310) of the blade.

Accordingly, in the shearable region which is the annular region, the cutting efficiency can be improved.

13. In the work machine (for example, 10) according to the above embodiment, the guard pole portion includes a plurality of guard poles (for example, 211 to 214) and a plurality of support poles (for example, 221 to 224), the guard poles are parallel to one another, each of the guard poles includes a left inclined portion (for example, 211*c*) and a right inclined portion (for example, 211*a*) extending obliquely backward respectively to the left and right with respect to the machine body longitudinal direction of the work machine, the left inclined portion and the right inclined portion are continuous in an arc shape at a center of the work machine (for example, 211*b*), the support poles have arc shapes parallel to one another, and one end of each of the support poles is connected to the left inclined portion of one guard pole (for example, 214) of the plurality of guard poles, and the other end is connected to the right inclined portion of the one guard pole.

As a result, the interval between the guard poles and the interval between the support poles become uniform, and thus it is possible to reduce uneven cutting of plants. In addition, it is possible to efficiently cut plants left uncut on the front side in the advancing direction of the work machine on the rear side where the arc-shaped support pole exists. In addition, by providing the support pole, rigidity of the guard pole portion can be improved, and thus deformation of the guard pole portion can be suppressed even in a case where a force is applied from the outside.

In addition, by providing the arc portion (arc-shaped part) and the left and right inclined portions extending in the left-and-right and front-and-rear directions therefrom, in a case where an obstacle such as a plant, a pebble, or a tree branch present in the advancing direction of the work machine collides with the guard pole, a force that deforms the guard pole acts. However, it is possible to improve the durability of the guard pole against the force applied in such a case.

14. In the work machine (for example, 10) according to the above embodiment, further includes:

a support portion (for example, 501, 502) connected to the blade housing, and the guard pole portion is connected to the support portion and supported by the blade housing via the support portion.

As a result, a stronger connection can be made at the connection part to which the guard pole portion is connected. In addition, since the support portion may be attached to the blade housing, it is not necessary to change the shape of the blade housing at the front, rear, left, and right sides, and thus the manufacturing cost of the blade housing can be reduced.

According to the present invention, it is possible to efficiently cut plants while maintaining work safety.

What is claimed is:

1. A work machine comprising:

a blade;

a blade housing; and a guard pole portion provided below the blade, wherein the guard pole portion is supported by the blade housing, and the guard pole portion includes an inclined portion extending in an oblique direction with respect to a machine body longitudinal direction of the work machine, wherein the inclined portion includes a left inclined portion and a right inclined portion extending in the oblique direction respectively to the left and right with respect to the machine body longitudinal direction of the work machine, and the left inclined portion and the right inclined portion are continuous in an arc shape at a center of the work machine, wherein the guard pole portion includes a plurality of guard poles, and the arc-shaped parts of each of the guard poles are concentrically arranged.

2. The work machine according to claim 1, wherein the inclined portion is provided below at least a part of a shearable region of the blade.

3. The work machine according to claim 2, wherein the shearable region is an annular region having a predetermined width and formed by rotation of a shearing portion of the blade about a rotary shaft of the blade.

4. The work machine according to claim 1, wherein the guard pole portion includes a plurality of guard poles, and the inclined portions of each of the guard poles are parallel to each other.

5. The work machine according to claim 1, wherein the left inclined portion and the right inclined portion extend obliquely backward respectively to the left and right, from a position on a center line passing through the center of the work machine and extending in the machine body longitudinal direction.

6. The work machine according to claim 1, wherein the guard pole portion includes a support pole portion that supports the inclined portion.

7. The work machine according to claim 6, wherein the support pole portion has an arc shape.

8. The work machine according to claim 1, wherein the guard pole portion is arranged parallel to the ground.

9. The work machine according to claim 1, wherein the oblique direction is any direction in a range of 15 degrees to 75 degrees with respect to the machine body longitudinal direction.

10. The work machine according to claim 1, further comprising a support portion connected to the blade housing, wherein the guard pole portion is supported by the blade housing via the support portion.

9

11. A work machine, comprising:

a blade;

a blade housing; and a guard pole portion provided below the blade, wherein the guard pole portion is supported by the blade housing, and the guard pole portion includes an inclined portion extending in an oblique direction with respect to a machine body longitudinal direction of the work machine, wherein the guard pole portion includes a support pole portion that supports the inclined portion, wherein the support pole portion includes a plurality of support poles, and the plurality of support poles are arranged at equal intervals.

12. A work machine, comprising:

a blade;

a blade housing; and a guard pole portion provided below the blade, wherein the guard pole portion is supported by the blade housing, and

10 the guard pole portion includes an inclined portion extending in an oblique direction with respect to a machine body longitudinal direction of the work machine, wherein the guard pole portion includes a plurality of guard poles and a plurality of support poles, the guard poles are parallel to one another, each of the guard poles includes a left inclined portion and a right inclined portion extending obliquely backward respectively to the left and right with respect to the machine body longitudinal direction of the work machine, the left inclined portion and the right inclined portion are continuous in an arc shape at a center of the work machine, the support poles have arc shapes parallel to one another, and one end of each of the support poles is connected to the left inclined portion of one guard pole of the plurality of guard poles, and the other end is connected to the right inclined portion of the one guard pole.

* * * * *